United States Patent
Han et al.

(10) Patent No.: US 10,154,488 B2
(45) Date of Patent: Dec. 11, 2018

(54) DYNAMIC SUB-BAND ALLOCATION IN THE TIME-VARIANT CHANNEL

(71) Applicant: INDUSTRY-ACADEMIC COOPERATION FOUNDATION, YONSEI UNIVERSITY, Seoul (KR)

(72) Inventors: Sang Kook Han, Seoul (KR); Soo Min Kang, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 126 days.

(21) Appl. No.: 15/348,485

(22) Filed: Nov. 10, 2016

(65) Prior Publication Data
US 2017/0135100 A1    May 11, 2017

(30) Foreign Application Priority Data
Nov. 11, 2015   (KR) .................. 10-2015-0158451

(51) Int. Cl.
*H04W 72/04*    (2009.01)
*H04W 72/08*    (2009.01)

(52) U.S. Cl.
CPC ..... *H04W 72/0446* (2013.01); *H04W 72/085* (2013.01); *H04W 72/087* (2013.01); *H04W 72/0453* (2013.01)

(58) Field of Classification Search
CPC ................. H04W 72/0446; H04W 72/085
See application file for complete search history.

(56) References Cited

U.S. PATENT DOCUMENTS

| | | | |
|---|---|---|---|
| 8,537,760 B2 | 9/2013 | Tee et al. | |
| 2003/0031234 A1* | 2/2003 | Smee | H04B 7/0848 375/147 |
| 2003/0118131 A1* | 6/2003 | Kobylinski | H04L 25/0204 375/341 |
| 2006/0135075 A1* | 6/2006 | Tee | H04L 5/0007 455/67.13 |

FOREIGN PATENT DOCUMENTS

| | | |
|---|---|---|
| KR | 10-2004-0083805 A | 10/2004 |
| KR | 10-2005-0050922 A | 6/2005 |
| KR | 10-0522604 B | 10/2005 |
| KR | 10-2006-0078880 A | 7/2006 |
| KR | 10-0839011 B | 6/2008 |
| KR | 10-0881783 B | 2/2009 |

OTHER PUBLICATIONS

Notice of Allowance dated Feb. 10, 2017 in corresponding Korean Patent Application No. 10-2015-0158451.

* cited by examiner

*Primary Examiner* — Christine Ng
(74) *Attorney, Agent, or Firm* — Sughrue Mion, PLLC (57) ABSTRACT

Disclosed are a communication method of dynamically allocating subbands in a time-variant channel and a device therefor. In particular, the communication device using dynamically allocated subbands in a time-variant channel includes a subband allocation mode selection unit that selects any one of subband allocation modes based on a communication requirement; a channel estimation unit that performs channel estimation on a plurality of subbands based on the currently selected subband allocation mode; and a control unit that transmits channel estimation information on the subbands to a subband allocation device and is allocated at least one subband satisfying the communication requirement from the subband allocation device.

16 Claims, 7 Drawing Sheets

DYNAMIC SUB-BAND ALLOCATION IN THE TIME-VARIANT CHANNEL

CROSS-REFERENCE TO RELATED APPLICATION

This application claims the priority benefit of Korean Patent Application No. 10-2015-0158451, filed on Nov. 11, 2015 in the Korean Intellectual Property Office, the disclosure of which is incorporated herein by reference.

BACKGROUND OF THE INVENTION

Field of the Invention

The present disclosure relates to allocating subbands in a time-variant channel, and more particularly, to a communication system for allocating subbands in a data transmission and reception system based on multi-carrier.

Description of the Related Art

In a time-variant channel, a suitable radio resource is allocated to a transmitter and a receiver depending upon a state of the channel, and data can be transmitted and received through the allocated radio resource.

For example, a multi-carrier based communication system, which uses a scheme such as Orthogonal Frequency Division Multiplexing (OFDM), uses more information on channel state, and thus, can be more effectively operated.

In general, in a communication system based on multi-carrier, a channel is allocated by using a signal-to-noise ratio (SNR) measured during a certain period using information on a state of the channel, or by preferentially allocating the best channel based on previous information on channel state.

However, such conventional simple channel allocation schemes have difficulty in adaptively reflecting requirements of a user and the like. In addition, in the schemes, bits or power is allocated in a whole frequency band.

SUMMARY OF THE INVENTION

Therefore, the present invention has been made in view of the above problems, and it is an object of the present invention to provide a method of flexibly allocating independent subbands according to requirements of each user (or each terminal) in a time-variant channel environment, such as a communication system based on multi-carrier, in which a number of users asynchronously, multiply access, and a device therefor.

It is another object of the present invention to provide a method of satisfying different channel requirements of users (or terminals) in a time-variant channel environment and guaranteeing flexible subband use depending upon channel state, and a device therefor.

It is yet another object of the present invention to provide a method of selecting only subbands necessary for a user (or a terminal) and allocating the selected subbands, by dividing a limited frequency resource into independent subbands, and a device therefor.

In accordance with the present invention, the above and other objects can be accomplished by the provision of a communication device using dynamically allocated subbands in a time-variant channel, the communication device including: a subband allocation mode selection unit that selects any one of subband allocation modes based on a communication requirement; a channel estimation unit that performs channel estimation on a plurality of subbands based on the currently selected subband allocation mode; and a control unit that transmits channel estimation information on the subbands to a subband allocation device and is allocated at least one subband satisfying the communication requirements from the subband allocation device.

In accordance with another aspect of the present invention, there is provided a communication device using dynamically allocated subbands in a time-variant channel including: a communication requirement determination unit that determines a communication requirement based on at least any one of information on user requirements, characteristics of transmission data, setting information on a currently running application, and a data transmission and reception environment to a data receiver; a subband allocation mode selection unit that selects any one of subband allocation modes based on the communication requirement; and a control unit that transmits information on the selected subband allocation mode and channel state information on a plurality of subbands to a subband allocation device and is allocated at least one subband satisfying the communication requirements from the subband allocation device.

Here, the channel estimation on the subbands is performed based on the currently selected subband allocation mode.

In accordance with another aspect of the present invention, there is provided a method of being dynamically allocating subbands in a time-variant channel, the method including: selecting any one of subband allocation modes based on a communication requirement; performing channel estimation on a plurality of subbands based on the currently selected subband allocation mode; and being allocated at least one subband satisfying the communication requirements based on the channel estimation on the subbands.

In accordance with another aspect of the present invention, there is provided a communication method of using dynamically allocated subbands in a time-variant channel, the communication method including: determining a communication requirement based on at least any one of information on user requirements, characteristics of transmission data, setting information on a currently running application, and a data transmission and reception environment to a data receiver; selecting any one of subband allocation modes based on the communication requirement; and transmitting information on the selected subband allocation mode and channel estimation information on a plurality of subbands to a subband allocation device and being allocated at least one subband satisfying the communication requirements from the subband allocation device.

In accordance with another aspect of the present invention, there is provided a method of being dynamically allocated subbands in a time-variant channel, the method including: selecting any one of subband allocation modes; performing channel estimation on a plurality of subbands based on the currently selected subband allocation mode, but performing different channel estimation operation for each of the subband allocation modes; and being allocated at least one subband that satisfies a communication requirement based on the channel estimation on the subbands.

In accordance with another aspect of the present invention, there is provided a method of dynamically allocating subbands in a time-variant channel, the method including: receiving information on a selected subband allocation mode and channel state information on a plurality of subbands from a terminal; performing channel estimation on the subbands based on the information on the subband allocation mode and the channel state information on the subbands; and allocating at least one subband satisfying a communication requirement based on the channel estimation on the subbands to the terminal.

In accordance with yet another aspect of the present invention, there is provided a communication device of dynamically allocating subbands in a time-variant channel, the communication device including: a communication unit that receives information on a selected subband allocation mode and channel state information on a plurality of subbands from a terminal; a channel estimation unit that performs channel estimation on the subbands based on the information on the subband allocation mode and the channel state information on the subbands; and a subband allocation unit that allocates at least one subband satisfying the communication requirements to the terminal based on the channel estimation on the subbands.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, embodiments of the present invention are described in detail with reference to the accompanying drawings.

Figure 1:
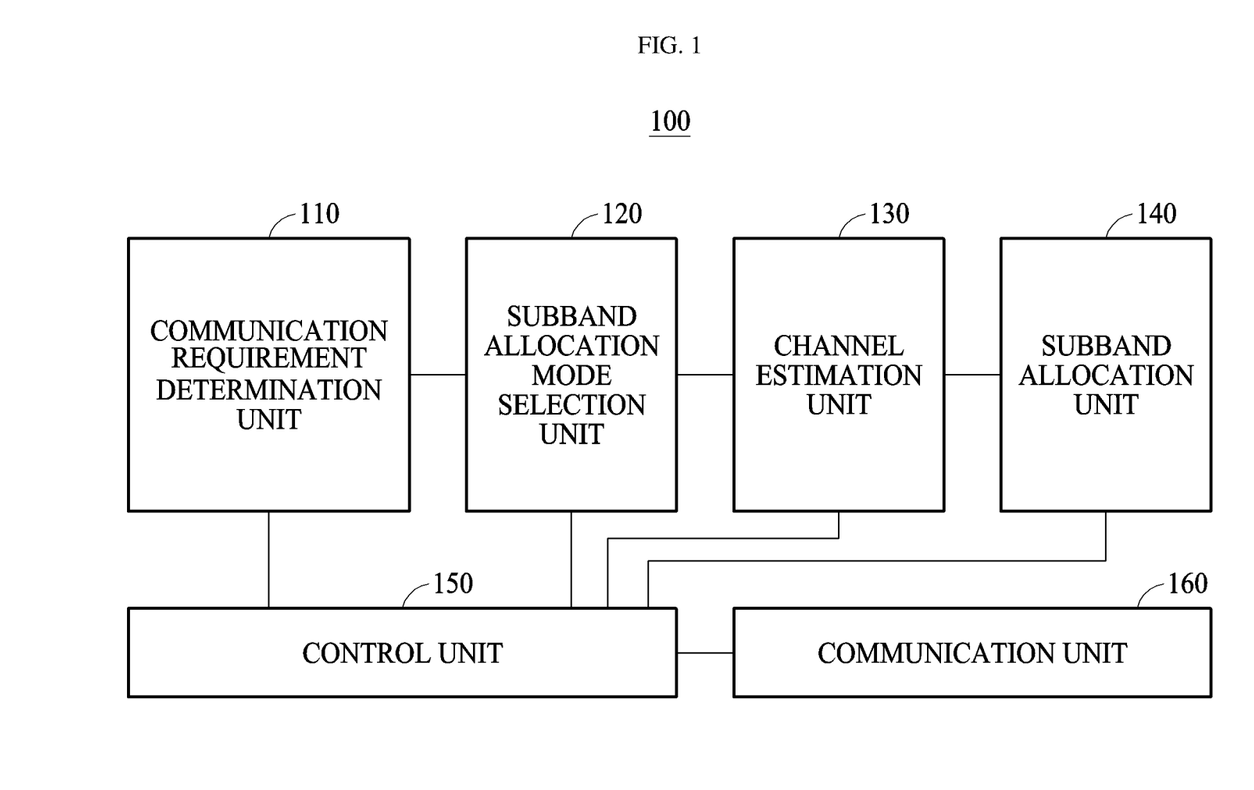
FIG. 1 illustrates a constitution of a communication device using dynamically allocated subbands in a time-variant channel according to an embodiment of the present invention.

FIG. 1 illustrates a constitution of a communication device using dynamically allocated subbands in a time-variant channel according to an embodiment of the present invention.

A communication device 100 illustrated in FIG. 1 may be a portion of a communication device used in an OFDM multiple access network based on multi-band.

For example, the communication device 100 illustrated in FIG. 1 may be provided to user terminals, base station equipment allocating channels, and the like.

In other words, the communication device 100 illustrated in FIG. 1 may be provided to a transmitter for transmitting data or a device for allocating a channel to a transmitter.

Referring to FIG. 1, the communication device 100 includes a communication requirement determination unit 110, a subband allocation mode selection unit 120, a channel estimation unit 130, and a subband allocation unit 140. In addition, the communication device 100 may further include a control unit 150 and a communication unit 160. Here, when the communication device 100 illustrated in FIG. 1 is provided to a terminal, the subband allocation unit 140 may be omitted.

The subband allocation mode selection unit 120 selects any one of subband allocation modes based on a communication requirement.

Here, the communication requirement may be set to various conditions. For example, the communication requirement may be a requirement of transmitting data via a subband satisfying a signal-to-noise ratio of a reference value or more.

The subband allocation modes may include at least one of a first mode determining a subband satisfying a signal-to-noise ratio (SNR) of a reference value or more, a second mode determining a subband that satisfies stable subband signal intensity, and a third mode satisfying all of the conditions of the first and second modes.

Here, when the communication requirement is being allocated a plurality of subbands, a subband allocation mode may be a mode for selecting a plurality of subbands satisfying channel state.

The channel estimation unit 130 performs channel estimation on the subbands based on the currently selected subband allocation mode.

When the channel estimation unit 130 performs channel estimation on the subbands, channel estimation operation is differently performed for each of the subband allocation modes.

In other words, the channel estimation unit 130 may calculate a parameter necessary for channel estimation for each of the subband allocation modes so as to select a subband satisfying a communication requirement.

The channel estimation unit 130 calculates SNR for the subbands when the currently selected subband allocation mode is the first mode, and calculates SNR and low-complexity variance for the subbands, when the currently selected subband allocation mode is the second mode.

When the currently selected subband allocation mode is the third mode, the channel estimation unit 130 additionally calculates an SNR average and variance ratio for the subbands.

The subband allocation unit 140 allocates at least one subband satisfying the communication requirement based on the channel estimation on the subbands.

The communication requirement determination unit 110 may determinate the communication requirement based on at least one of information on user requirements, characteristics of transmission data, setting information on a currently running application, and a data transmission and reception environment to a data receiver.

The user requirements information may be setting information that is directly input by a user. For example, the information set by a user is "long-distance transmission," a communication requirement may be determined as a case in which high SNR is necessary.

In addition, when the amount of transmission date to be transmitted is greater than a previously set value, a communication requirement may be determined as a condition in which signal intensity of subbands is stable (flat) and a plurality of subbands are required.

In addition, when a currently running application is related to sharing or transmission of multimedia data, the communication requirement determination unit 110 may determine a condition in which setting information of the application is investigated and high SNR and stable SNR are simultaneously required.

As such, a communication requirement may be variously determined depending upon user requirements or the characteristics of date to be transmitted. In addition, a subband allocation mode suitable for a determined communication requirement may be selected.

Accordingly, the subband allocation mode selection unit 120 may select any one mode of the first and second modes based on at least one of information on user requirements, characteristics of transmission data, setting information on a currently running application, and a data transmission and reception environment to a data receiver.

For example, the subband allocation mode selection unit 120 may select a subband allocation mode, i.e., the first or second mode, considering characteristics of transmission data. Here, which subband allocation mode type is selected in which case may be previously set or may be determined according to setting by a manufacturer of the communication device 100.

The control unit 150 transmits channel estimation information on the subbands to a subband allocation device and may be allocated at least one subband satisfying the communication requirement from the subband allocation device.

The control unit 150 may investigate change of the communication requirement and reselection of the subband allocation mode.

The control unit 150 may control the channel estimation unit 130 such that channel estimation on the subbands is reperformed according to a previously set period or such that the channel estimation on the subbands is reperformed based on the communication requirement.

In addition, the control unit 150 may control a communication unit 160 such that transmission data is transmitted through at least one of the allocated subbands.

The control unit 150 may include at least one processor configured to perform a corresponding function.

The communication unit 160 may transmit a data symbol through a selected subband.

Hereinafter, embodiments of channel estimation and subband allocation manners for each of the subband allocation modes performed in the channel estimation unit 130 and the subband allocation unit 140 are described.

A subband allocation method according to an embodiment of the present invention may be applied to all transmission channels changing according to periods when a signal is transmitted from a communication system based on a multi-band multi-carrier.

The subband allocation mode may be selected from the first to third modes. Of course, the subband allocation mode may be set to various modes other than the first to third modes.

As described above, the first mode may be selected when high SNR is required as in long-distance transmission, and the second mode may be selected when stable signal intensity of subbands to be used is desired. In addition, the third mode may be selected when both conditions of both the first and second modes are required.

In other words, the third mode may be realized by performing logical AND operation on the first and second modes.

Channel estimation may be performed using a test symbol which both of a transmitter and a receiver recognize.

The channel estimation may be performed after or before selection of a subband allocation mode. However, the communication device 100 illustrated in FIG. 1 performs channel estimation operation according to a selected subband allocation mode after selection of a subband allocation mode because channel estimation operation is differently used for each of the subband allocation modes.

When test symbol $X_{train}$ is transmitted from a transmitter, a receiver may estimate information H on a current channel state through $Y_{train}$.

In other words, $X_{train}$ and $Y_{train}$ are related as shown in Equation 1 below.

$$Y_{train} = HX_{train} \quad \text{[Equation 1]}$$

In a channel estimation process, SNR or variance of SNR for each of multi-carriers may be calculated. Here, low-complexity variance of SNR may be calculated according to Equation 2 below.

$$V_N = \frac{\sum_{j=1}^{N_{carrier}} |SNR_j - E_N|}{N_{carrier}} \quad \text{[Equation 2]}$$

Here, $N_{carrier}$ represents the number of subcarriers belonging to one subband, $SNR_j$ represents SNR of a j-th subcarrier, and $E_N$ represents an average of SNR of an N-th subband.

Here, $N_{carrier}$ may be defined by Equation 3 and $E_N$ may be defined by Equation 4. In Equation 3, N represents total number of subband.

$$N_{carrier} = \frac{N_{total}}{N} \quad \text{[Equation 3]}$$

$$E_N = \frac{\sum_{j=1}^{N_{carrier}} SNR_j}{N_{carrier}} \quad \text{[Equation 4]}$$

$$\text{Ratio} = \frac{E_N}{V_N} \quad \text{[Equation 5]}$$

In Equation 5, Ratio represents a ratio of the average of SNR to a variance.

The channel estimation unit 130 may merely calculate SNR [dB] when the currently selected subband allocation mode is the first mode, the channel estimation unit 130 may calculate SNR, and then calculate low-complexity variance for each of the subbands according to Equation 2 when the currently selected subband allocation mode is the second mode, and the channel estimation unit 130 may calculate Ratio of Equation 5 when the currently selected subband allocation mode is the third mode.

By using Equations 2 to 5, complexity of calculation of which is reduced, a calculation amount may be reduced and faster channel estimation is possible compared to conventional channel estimation calculation.

When users, i.e., user terminals, are 1 to k, each of the users may use any one of 1-th to N-th subbands. However, overlapping use between users is not allowed, but any subbands might not be used.

Accordingly, the number of subbands that may be allocated to one user or may be selected by one user may be selected through Equation 5 below.

Let A be a set of total users' subband =  [Equation 6]

$\{1, 2, \ldots, N\}$ and set of $k_{th}$ user's subband$(A_k) \subset A$ $\biguplus A_i \subset A, (i = 1, 2, \ldots, k),$ $\biguplus \leftarrow$ disjoint set $N_{use}$ $$\begin{cases} \text{such that } n_i = n(A_i) \\ = \biguplus^k \quad \begin{pmatrix} \text{if different number of} \\ \text{subband is used per user} \end{pmatrix} \\ = nC_{k+n} \quad \begin{pmatrix} \text{if same number of} \\ \text{subband is used per user} \end{pmatrix} \end{cases}$$

Here, $N_{use}$ represents the number of subbands to be used, k represents the number of multiple access users, n represents the number of subbands desired by a user, and $n_i$ represents the number of element in $A_i$. To prevent overlapping use between users, disjoint set ($\biguplus$) is used and set of total user's subband (A) is combining $\biguplus_{i=1}^{k} A_i$. If same number of subband is allocated per user, the number of selected subbands is calculated through combination operation of k, n, and N, thereby avoiding overlapping of subbands. On the other hand, if different number of subband is allocated per user, the number of selected subbands is calculated through summation of union represented as $n_t$.

A subband to be allocated may be determined through descending or ascending sort of estimated parameters or channel estimation values for each of subband selection modes.

Here, in the case of the first mode, estimated parameters or channel estimation values are arranged through descending sort. In the case of the second mode, estimated parameters or channel estimation values are arranged through ascending sort, and then subbands may be allocated in a higher value order. In the case of the third mode, a ratio of the average of SNR to low-complexity variance may be arranged in descending order, and then subbands may be allocated in a higher value order.

The subband allocation unit 140 may determine subbands to be On (subbands to be used) or Off (subbands not to be used) among the subbands, referring to the arranged list, and the communication unit 160 may transmit transmission data through the subbands set to On.

When the subband allocation unit 140 is provided to a subband allocation device (for example, a base station), the subband allocation unit 140 may allocate subbands to be On (subbands to be used) or Off (subbands not to be used) among the subbands to a terminal, referring to the arranged list, and may transmit information on the allocated subbands to the terminal. Here, the terminal may transmit transmission data through the allocated subbands.

Since channel state changes in a time-variant channel situation, channel estimation may be updated.

The control unit 150 may allocate subbands suitable for user requirements by determining implementation of update, re-transmitting a test symbol, and re-estimating the channel.

In other words, selection of a subband selection mode suitable for user requirements and selection of subbands to be used may be repeatedly updated.

When update is not necessary or data transmission is completed, all procedures to allocate subbands may be may be terminated.

According to an embodiment of the present invention, flexible handling according to a channel environment is possible by determining implementation of update of the channel estimation or subband allocation mode selection depending upon channel state.

As illustrated in FIG. 1, unlike a conventional manner wherein subbands desired by a user are merely filtered through a separate Band Pass Filter (BPF) from a receiver, a user merely transmits necessary subbands from the beginning upon transmission of a signal and thus complexity of a system and power consumption may be reduced.

For example, since broadcasting, at which power consumption is high, is not necessary, power efficiency increases, and independent and changeable subband allocation is possible according to channel state.

An embodiment of the communication system of the present invention is applied to a receiver, BPF may be omitted and thus there are advantages in terms of power efficiency and complexity.

Meanwhile, in the case of a conventional communication device including BPF, the conventional communication device is compatible with an embodiment of the communication system of the present invention in a manner of inactivating BPF by previous appointment between a transmitter and a receiver.

Figure 2:
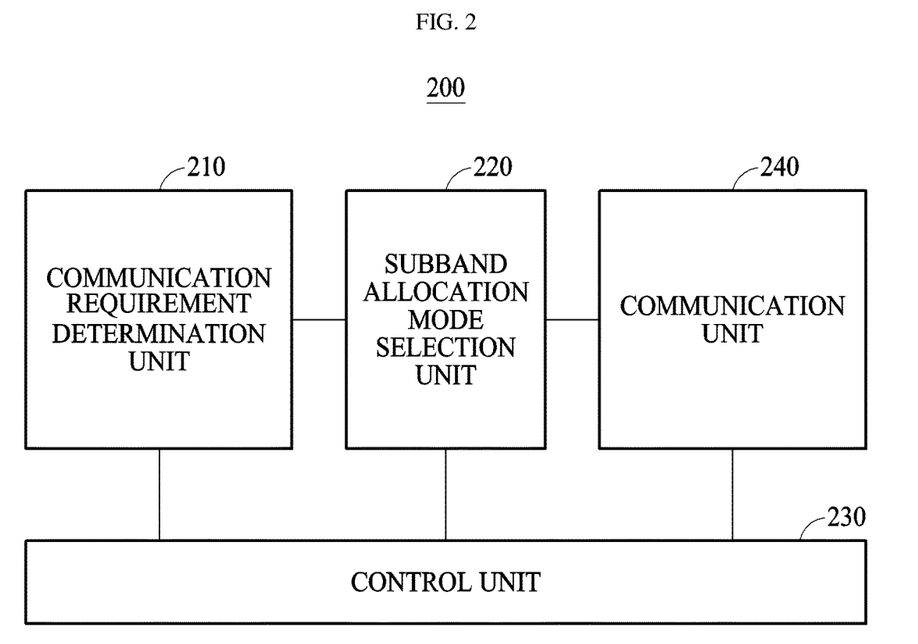
FIG. 2 illustrates a constitution of a communication device using dynamically allocated subbands in a time-variant channel according to another embodiment of the present invention.

FIG. 2 illustrates a constitution of a communication device using dynamically allocated subbands in a time-variant channel according to another embodiment of the present invention.

A communication device 200 illustrated in FIG. 2 may be provided to a user terminal.

Constituents having the same designations as those of FIG. 1 may perform functions identical or similar to those of FIG. 1. Therefore, detailed descriptions of constituents illustrated in FIG. 1 are omitted.

Referring to FIG. 2, the communication device 200 includes a communication requirement determination unit 210, a subband allocation mode selection unit 220, a control unit 230, and a communication unit 240.

The communication requirement determination unit 210 may determine the communication requirement based on at least one of information on user requirements, characteristics of transmission data, setting information on a currently running application, and a data transmission and reception environment to a data receiver.

Here, information on the communication requirement is transmitted to a separate communication device (not shown), such as a base station, and the separate communication device may investigate the received communication requirement and then may select a subband allocation mode.

The subband allocation mode selection unit 220 selects any one of subband allocation modes based on the communication requirement.

The control unit 230 transmits information on the selected subband allocation mode and channel state information on the subbands to a subband allocation device and is allocated at least one subband satisfying the communication requirement by the subband allocation device.

Unlike the communication device 100 illustrated in FIG. 1, channel estimation according to a subband allocation mode may be performed in the subband allocation device (not shown).

For example, when information on a subband allocation mode is the first mode, the subband allocation device may perform channel estimation based on SNR information on each of the subbands included in the information on channel state. Accordingly, the information on channel state may include SNR information and intensity of a received signal, for each of the subbands.

The control unit 230 is allocated at least one subband satisfying the communication requirement based on the channel estimation on the subbands, and controls the communication unit 240 such that transmission data is transmitted through the at least one allocated subband.

The communication unit 240 may transmit a test symbol, transmission data, etc. according to control of the control unit 230 and may receive information on the allocated subbands.

Here, channel estimation on the subbands is performed based on the currently selected subband allocation mode after selecting any one of the subband allocation modes based on the communication requirement.

Here, the channel estimation may be performed in a separate communication device such as a base station.

Figure 3:
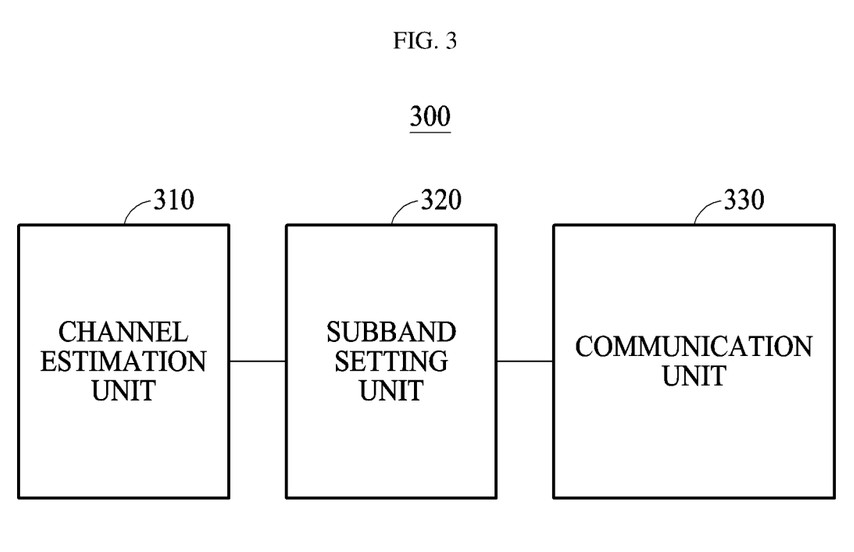
FIG. 3 illustrates a constitution of a communication device dynamically allocating subbands in a time-variant channel according to an embodiment of the present invention.

FIG. 3 illustrates a constitution of a communication device dynamically allocating subbands in a time-variant channel according to an embodiment of the present invention.

A communication device 300 illustrated in FIG. 3 may be provided to a subband allocation device such as a base station.

The communication device 300, for example, may select any one mode of the first to third modes and perform channel estimation according to the selected mode, followed by transmitting data by selecting subbands to be used.

Referring to FIG. 3, the communication device 300 includes a channel estimation unit 310, a subband setting unit 320, and a communication unit 330.

The channel estimation unit 310 performs channel estimation on the subbands, but performs different channel estimation operation for each of subband allocation modes.

The subband setting unit 320 sets subbands to be allocated to a terminal among the subbands based on the currently selected subband allocation mode and the channel estimation.

The communication unit 330 may receive information on the selected subband allocation mode and channel state information on the subbands from the terminal and may transmit information on allocated subbands to the terminal.

Figure 4:
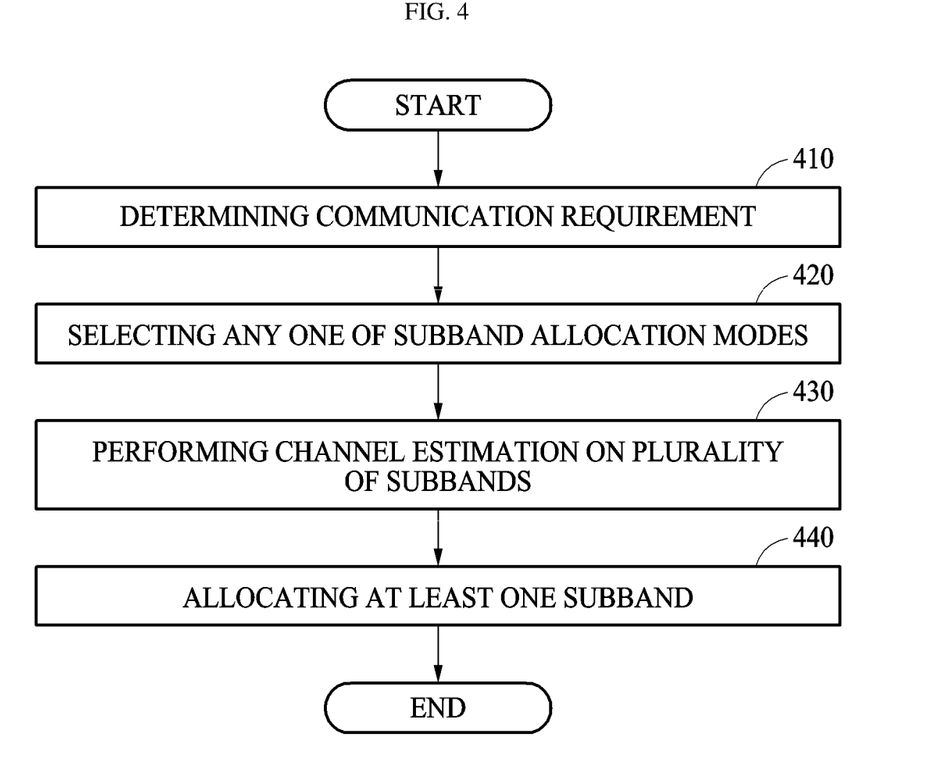
FIG. 4 is a flowchart illustrating a method of being dynamically allocated subbands in a time-variant channel according to an embodiment of the present invention.

FIG. 4 is a flowchart illustrating a method of being dynamically allocated subbands in a time-variant channel according to an embodiment of the present invention.

The method illustrated in FIG. 4 may be performed by means of the communication device 100 illustrated in FIG. 1.

In step 410, a communication device may determine the communication requirement based on at least any one of information on user requirements, characteristics of transmission data, setting information on a currently running application, and a data transmission and reception environment to a data receiver.

In step 420, the communication device selects any one of a plurality of subband allocation modes based on the communication requirement.

In step 430, the communication device performs channel estimation on the subbands based on the currently selected subband allocation mode.

In step 440, the communication device is allocated at least one subband satisfying the communication requirement by a subband allocation device based on the channel estimation on the subbands.

Figure 5:
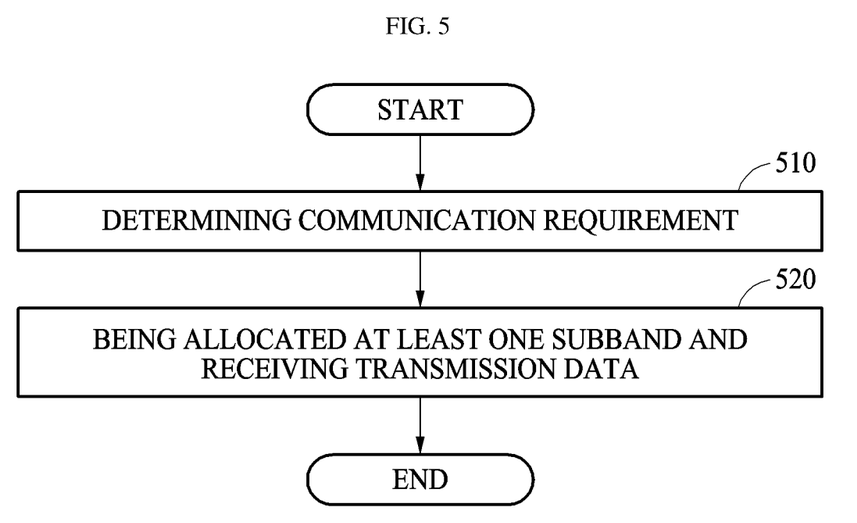
FIG. 5 is a flowchart illustrating a communication method of using dynamically allocated subbands in a time-variant channel according to an embodiment of the present invention.

FIG. 5 is a flowchart illustrating a communication method of using dynamically allocated subbands in a time-variant channel according to an embodiment of the present invention.

The method illustrated in FIG. 5 may be performed be means of the communication device 200 illustrated in FIG. 2.

In step 510, a communication device determines the communication requirement based on at least any one of information on user requirements, characteristics of transmission data, setting information on a currently running application, and a data transmission and reception environment to a data receiver.

The communication device may select any one of subband allocation modes based on the communication requirement, and transmit information on the selected subband allocation mode and channel estimation information on the subbands to a device performing channel allocation.

In step 520, the communication device is allocated at least one subband satisfying the communication requirement and received transmission data through the at least one allocated subband.

Figure 6:
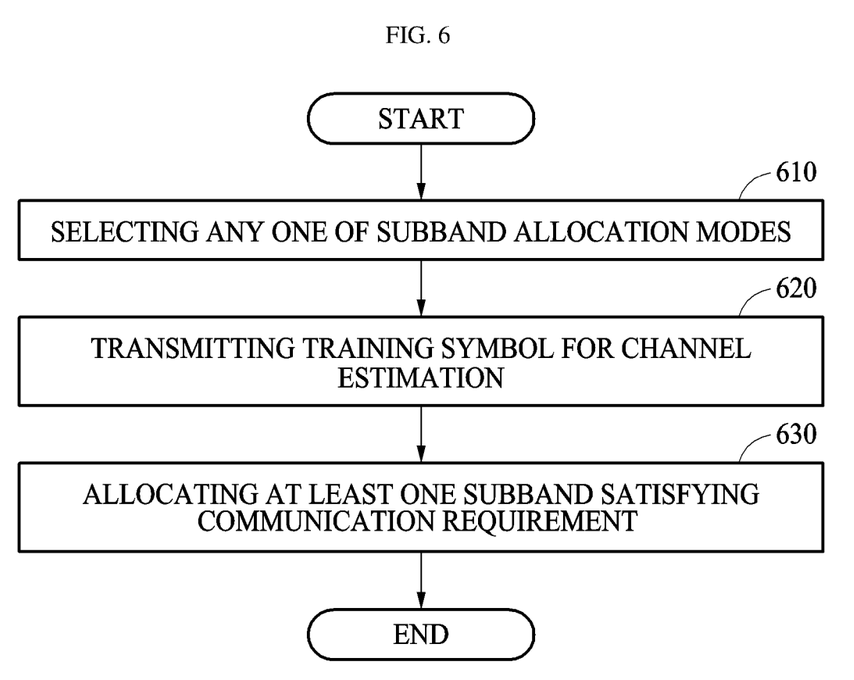
FIG. 6 is a flowchart illustrating a method of being dynamically allocated subbands in a time-variant channel according to another embodiment of the present invention.

FIG. 6 is a flowchart illustrating a method of being dynamically allocated subbands in a time-variant channel according to another embodiment of the present invention.

The method illustrated in FIG. 6 may be performed by means of the communication device 100 illustrated in FIG. 1.

In step 610, a communication device selects any one of subband allocation modes.

In step 620, the communication device transmits training symbol to estimate channel state.

In step 630, the communication device is allocated at least one subband satisfying a communication requirement based on the channel estimation on the subbands.

Figure 7:
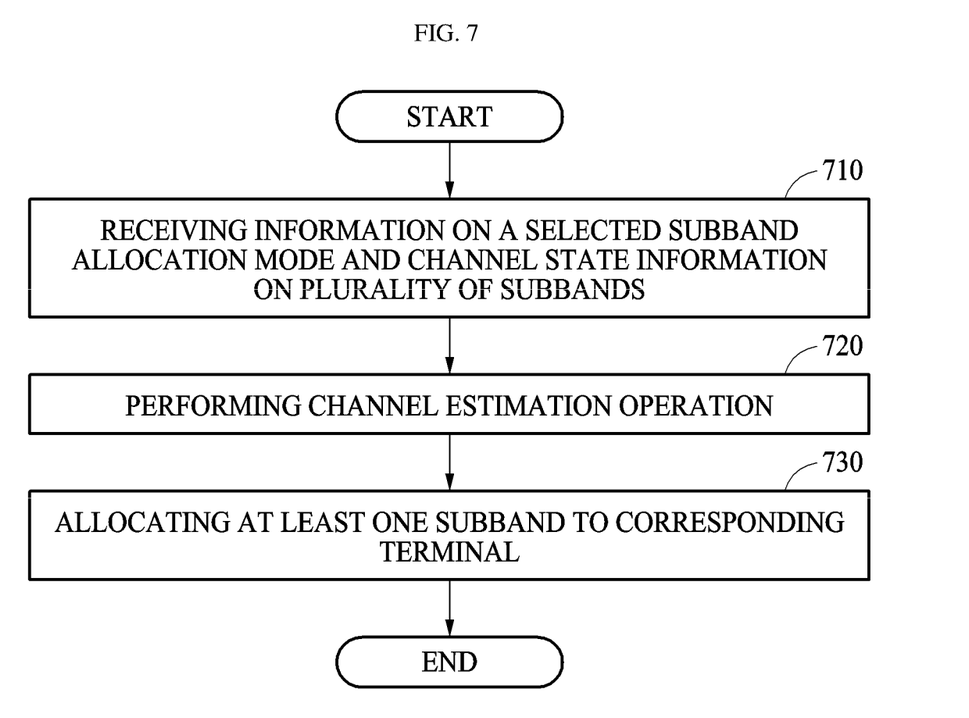
FIG. 7 is a flowchart illustrating a communication method of dynamically allocating subbands in a time-variant channel according to another embodiment of the present invention.

FIG. 7 is a flowchart illustrating a communication method of dynamically allocating subbands in a time-variant channel according to another embodiment of the present invention.

The method illustrated in FIG. 7 may be performed by means of the communication device 300 illustrated in FIG. 3.

In step 710, a communication device receives information on a selected subband allocation mode and channel state information on a plurality of subbands from a terminal.

In step 720, the communication device performs channel estimation operation on the subbands based on the information on the subband allocation mode and the channel state information on the subbands.

In step 730, the communication device allocates at least one subband satisfying the communication requirement to a corresponding terminal, based on the channel estimation on the subbands.

The aforementioned device may be realized by hardware component, a software component, and/or a combination of hardware and software components. For example, the device and components described in the embodiments may be realized using one or more general-purpose computers or special-purpose computers such as, for example, a processor, a controller, an arithmetic logic unit (ALU), a digital signal processor, a microcomputer, a field programmable array (FPA), a programmable logic unit (PLU), a microprocessor, or other devices implementing instructions and responding thereto. The processor may execute one or software applications that run on an operating system (OS). In addition, the processor may approach data, store, manipulate, and process the data, and generate new data by responding to running of software. Although one processor has been used to aid in understanding, those skilled in the art can understand that the processor may include a plurality of processing elements and/or a plurality of processing element types. For example, the processor may include a plurality of processors or a combination of one processor and controller. Further, another processing configuration, such as a parallel processor, may be applied.

Embodiments of the present invention can include a computer readable medium including program commands for executing operations implemented through various computers. The computer readable medium can store program commands, data files, data structures or combinations thereof. The program commands recorded in the medium may be specially designed and configured for the present invention or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include a machine language code created by a compiler and a high-level language code executable by a computer using an interpreter and the like. The hardware devices may be configured to operate as one or more software modules to perform operations in the embodiments, and vice versa.

According to an embodiment of the present invention, it is possible to independently, flexibly allocate a frequency resource to a user by dividing a limited whole band into independent subbands.

According to an embodiment of the present invention, only necessary subbands may be selected and only selected data may be transmitted, whereby power consumption of a terminal may be reduced.

According to an embodiment of the present invention, it is possible to satisfy different channel requirements of users (or terminals) in a time-variant channel environment, and guarantee flexible subband use depending upon channel state.

Although exemplary embodiments of the present invention have been disclosed for illustrative purposes, those skilled in the art will appreciate that various modifications, additions and substitutions are possible, without departing from the scope and spirit of the invention as disclosed in the accompanying claims. For example, proper result may be achieved even if the techniques described above are implemented in an order different from that for the disclosed method, and/or disclosed constituents such as a system, structure, device and circuit are coupled to or combined with each other in a form different from that for the disclosed method or replaced by other constituents or equivalents.

It should be understood, however, that there is no intent to limit the invention to the embodiments disclosed, rather, the invention is to cover all modifications, equivalents, and alternatives falling within the spirit and scope of the invention as defined by the claims.

What is claimed is:

1. A communication device using dynamically allocated subbands in a time-variant channel, the communication device comprising:
   a memory configured to store computer-readable instructions; and
   one or more processors configured to execute the computer-readable instructions such that the one or more processors are configured:
   to select any one of subband allocation modes based on a communication requirement;
   to perform channel estimation on a plurality of subbands based on the selected subband allocation mode; and
   to transmit channel estimation information on the subbands to a subband allocation device and to be allocated at least one subband satisfying the communication requirement from the subband allocation device,
   wherein the subband allocation modes comprise at least any one of a first mode that determines subbands satisfying a signal-to-noise ratio (SNR) of a reference value or more, a second mode that determines subbands satisfying stable subband signal intensity, and a third mode that satisfies all of the conditions of the first and second modes, and
   wherein the one or more processors are configured to calculate an SNR for the subbands when the selected subband allocation mode is the first mode, and calculate a low-complexity variance for the subbands when the selected subband allocation mode is the second mode.

2. The communication device according to claim 1, wherein the one or more processors are further configured to determine the communication requirement based on at least any one of information on user requirements, characteristics of transmission data, setting information on a currently running application, and a data transmission and reception environment to a data receiver.

3. The communication device according to claim 1, wherein the one or more processors are further configured to perform channel estimation on the subbands, but differently perform channel estimation operation for each of the subband allocation modes.

4. The communication device according to claim 1, wherein the one or more processors are further configured to select any one mode of the first and second modes based on at least one of information on user requirements, characteristics of transmission data, setting information on a currently running application, and a data transmission and reception environment to a data receiver.

5. The communication device according to claim 1, wherein the one or more processors are further configured to calculate a ratio of an average of SNR to variance for the subbands when the selected subband allocation mode is the third mode.

6. The communication device according to claim 1, wherein the one or more processors are further configured to investigate change of the communication requirement and reselection of the subband allocation mode.

7. The communication device according to claim 6, wherein the one or more processors are further configured to re-perform the channel estimation on the subbands according to a previously set period or re-perform the channel estimation on the subbands based on the communication requirement.

8. The communication device according to claim 6, wherein the one or more processors are further configured to transmit transmission data through at least one of the allocated subbands.

9. A communication device using dynamically allocated subbands in a time-variant channel, the communication device comprising:
   a memory configured to store computer-readable instructions; and
   one or more processors configured to execute the computer-readable instructions such that the one or more processors are configured:
   to determine a communication requirement based on at least any one of information on user requirements, characteristics of transmission data, setting information on a currently running application, and a data transmission and reception environment to a data receiver;

to select any one of subband allocation modes based on the communication requirement; and to transmit information on the selected subband allocation mode and channel state information on a plurality of subbands to a subband allocation device and to be allocated at least one subband satisfying the communication requirement from the subband allocation device, wherein a channel estimation on the subbands is performed based on the selected subband allocation mode, wherein the subband allocation modes comprise at least any one of a first mode that determines subbands satisfying a signal-to-noise ratio (SNR) of a reference value or more; a second mode that determines subbands satisfying stable subband signal intensity, and a third mode that satisfies all of the conditions of the first and second modes, and wherein the one or more processors are further configured to calculate an SNR for the subbands when the selected subband allocation mode is the first mode, and calculate an SNR and a low-complexity variance for the subbands when the selected subband allocation mode is the second mode.

10. A method of being dynamically allocating subbands in a time-variant channel, the method comprising:

selecting any one of subband allocation modes based on a communication requirement;

transmitting training symbol for channel estimation based on the selected subband allocation mode; and being allocated at least one subband satisfying the communication requirement based on the channel estimation on the subbands, wherein the subband allocation modes comprise at least any one of a first mode that determines subbands satisfying a signal-to-noise ratio (SNR) of a reference value or more, a second mode that determines subbands satisfying stable subband signal intensity, and a third mode that satisfies all of the conditions of the first and second modes, and wherein a channel estimation on the subbands is performed, and the performing of the channel estimation comprises calculating an SNR for the subbands when the selected subband allocation mode is the first mode, and calculating an SNR and a low-complexity variance for the subbands when the selected subband allocation mode is the second mode.

11. The method according to claim 10, further comprising, before the selecting, determining the communication requirement based on at least any one of information on user requirements, characteristics of transmission data, setting information on a currently running application, and a data transmission and reception environment to a data receiver.

12. The method according to claim 10, wherein the performing of the channel estimation comprises calculating a ratio of an average of SNR to variance for the subbands when the selected subband allocation mode is the third mode.

13. A communication method of using dynamically allocated subbands in a time-variant channel, the communication method comprising:

determining a communication requirement based on at least any one of information on user requirements, characteristics of transmission data, setting information on a currently running application, and a data transmission and reception environment to a data receiver;

selecting any one of subband allocation modes based on the communication requirement; and transmitting information on the selected subband allocation mode and training symbol for channel estimation on a plurality of subbands to a subband allocation device and being allocated at least one subband satisfying the communication requirement from the subband allocation device, wherein the channel estimation on the subbands is preformed based on the selected subband allocation mode, wherein the subband allocation modes comprise at least any one of a first mode that determines subbands satisfying a signal-to-noise ratio (SNR) of a reference value or more, a second mode that determines subbands satisfying stable subband signal intensity, and a third mode that satisfies all of the conditions of the first and second modes, and wherein the performing of the channel estimation comprises calculating an SNR for the subbands when the selected subband allocation mode is the first mode, and calculating an SNR and a low-complexity variance for the subbands when the selected subband allocation mode is the second mode.

14. A method of being dynamically allocated subbands in a time-variant channel, the method comprising:

selecting any one of subband allocation modes;

performing channel estimation on a plurality of subbands based on the selected subband allocation mode and transmitting training symbol for channel estimation operation for each of the subband allocation modes; and being allocated at least one subband that satisfies a communication requirement based on the channel estimation on the subbands, wherein the subband allocation modes comprise at least any one of a first mode that determines subbands satisfying a signal-to-noise ratio (SNR) of a reference value or more, a second mode that determines subbands satisfying stable subband signal intensity, and a third mode that satisfies all of the conditions of the first and second modes, and wherein the performing of the channel estimation comprises calculating an SNR for the subbands when the selected subband allocation mode is the first mode; and calculating an SNR and a low-complexity variance for the subbands when the selected subband allocation mode is the second mode.

15. A method of dynamically allocating subbands in a time-variant channel, the method comprising:

receiving information on a selected subband allocation mode and channel state information on a plurality of subbands from a terminal;

performing channel estimation on the subbands based on the information on the subband allocation mode and the channel state information on the subbands; and allocating at least one subband satisfying a communication requirement based on the channel estimation on the subbands to the terminal, wherein the subband allocation mode comprises any one of a first mode that determines subbands satisfying a signal-to-noise ratio (SNR) of a reference value or more, a second mode that determines subbands satisfying stable subband signal intensity, and a third mode that satisfies all of the conditions of the first and second modes, and wherein the performing of the channel estimation comprises calculating an SNR for the subbands when the selected subband allocation mode is the first mode, and calculating an SNR and a low-complexity variance for the subbands when the selected subband allocation mode is the second mode.

16. A communication device of dynamically allocating subbands in a time-variant channel, the communication device comprising:
  a memory configured to store computer-readable instructions; and
  one or more processors configured to execute the computer-readable instructions such that the one or more processors are configured:
    to receive information on a selected subband allocation mode and channel state information on a plurality of subbands from a terminal;
    to perform channel estimation on the subbands based on the information on the subband allocation mode and the channel state information on the subbands; and
    to allocate at least one subband satisfying a communication requirement to the terminal based on the channel estimation on the subbands,
  wherein the selected subband allocation mode comprises any one of a first mode that determines subbands satisfying a signal-to-noise ratio (SNR) of a reference value or more, a second mode that determines subbands satisfying stable subband signal intensity, and a third mode that satisfies all of the conditions of the first and second modes, and
  wherein the one or more processors are configured to calculate an SNR for the subbands when the selected subband allocation mode is the first mode, and calculate a low-complexity variance for the subbands when the selected subband allocation mode is the second mode.

* * * * *